(12) United States Patent
Tekletsadik et al.

(10) Patent No.: US 9,520,713 B2
(45) Date of Patent: Dec. 13, 2016

(54) FAST SWITCH FAULT CURRENT LIMITER

(71) Applicant: Varian Semiconductor Equipment Associates, Inc., Gloucester, MA (US)

(72) Inventors: Kasegn D. Tekletsadik, Middleton, MA (US); Charles L. Stanley, Amesbury, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 125 days.

(21) Appl. No.: 14/462,132

(22) Filed: Aug. 18, 2014

(65) Prior Publication Data

US 2015/0055260 A1    Feb. 26, 2015

Related U.S. Application Data

(60) Provisional application No. 61/868,717, filed on Aug. 22, 2013.

(51) Int. Cl.
| | |
|---|---|
| *H02H 3/00* | (2006.01) |
| *H02H 9/00* | (2006.01) |
| *H02H 9/02* | (2006.01) |
| *H01H 71/10* | (2006.01) |
| *H01H 83/02* | (2006.01) |
| *H01H 71/24* | (2006.01) |

(52) U.S. Cl.
CPC .............. *H02H 9/005* (2013.01); *H01H 71/10* (2013.01); *H01H 71/2409* (2013.01); *H02H 9/021* (2013.01); *H01H 71/2463* (2013.01); *H01H 83/02* (2013.01)

(58) Field of Classification Search
USPC ..................................................... 361/42, 115
See application file for complete search history.

(56) References Cited

U.S. PATENT DOCUMENTS

| | | | | |
|---|---|---|---|---|
| 5,089,797 A | * | 2/1992 | Grunert | H01H 71/2409 335/172 |
| 2003/0052756 A1 | | 3/2003 | Bollinger et al. | |
| 2003/0235021 A1 | * | 12/2003 | Siedelhofer | H01H 71/142 361/102 |

(Continued)

FOREIGN PATENT DOCUMENTS

KR    10-1074872 B1    10/2011

OTHER PUBLICATIONS

International Search Report and Written Opinion Mailed Nov. 27, 2014 for PCT/US2014/051680 Filed Aug. 19, 2014.

*Primary Examiner* — Danny Nguyen

(57) ABSTRACT

A fault current limiter circuit including a fast switch fault current limiter (FSFCL) and a voltage control reactor (VCR) operative to conduct load current during a steady state operation and limit load current when the load current exceeds fault current limits. The FSFCL may include a breaker having electrical contacts, a coil electrically coupled to the electrical breaker contacts, a plunger mechanically coupled to the electrical breaker contacts, a parallel voltage control (VCR), a transient overvoltage control circuit (TOCC), wherein when current greater than a threshold level flows through the coil, a magnetic field having strength to move the plunger is generated, the movement of the plunger operates to open the contacts in the breaker and transfer fault current to VCR and TOCC and limit the overall system fault current.

18 Claims, 10 Drawing Sheets

(56) References Cited

U.S. PATENT DOCUMENTS

| | | |
|---|---|---|
| 2005/0141163 A1 | 6/2005 | Franke et al. |
| 2007/0127171 A1 | 6/2007 | Lee et al. |
| 2013/0090243 A1 | 4/2013 | Edwards et al. |
| 2013/0135781 A1* | 5/2013 | Natili ........................ H02H 3/20 |
| | | 361/91.2 |

* cited by examiner

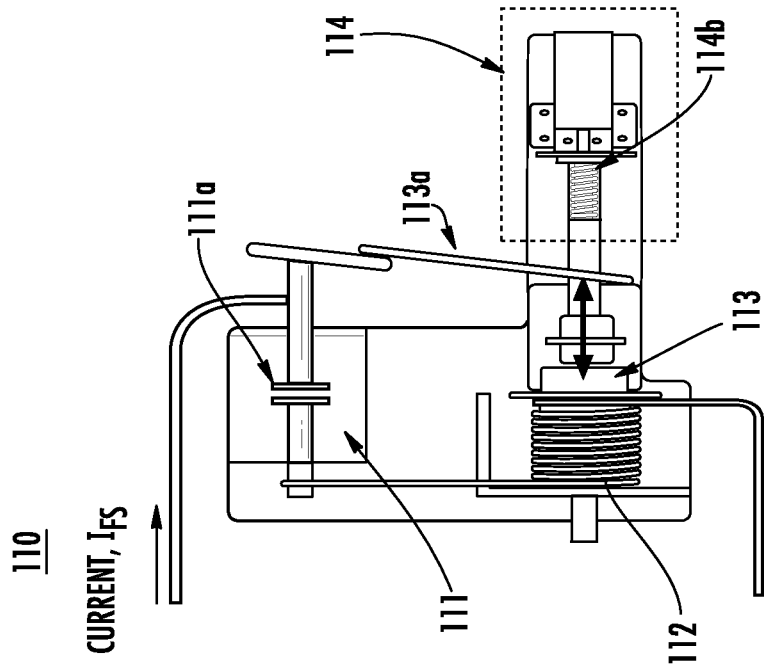
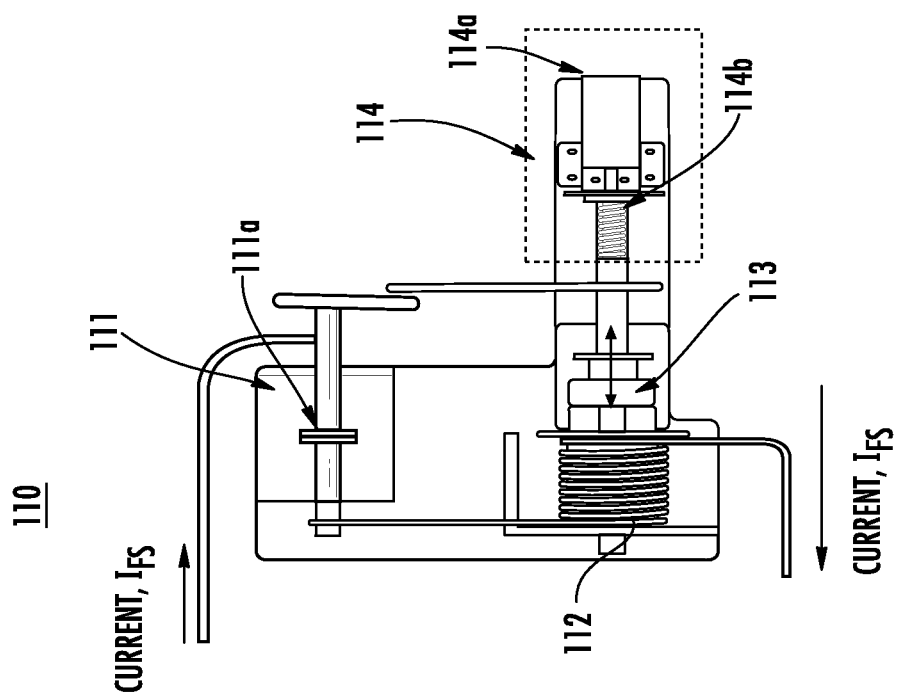

FAST SWITCH FAULT CURRENT LIMITER

FIELD

Embodiments of the present disclosure relate to current control devices, more particularly, to fault current limiters devices and systems.

BACKGROUND

Fault current limiters (FCLs) are used to provide protection against current surges, for example in a power transmission and distribution networks. Various types of FCLs have been developed over the last several decades, including superconducting fault current limiters (SCFCL), solid-state fault current limiters (SSFCL), inductive fault current limiters, as well as other varieties that are well known in the art. A power system implementing a FCL may include generation, transmission, and distribution networks that generate and deliver power to various industrial, commercial, and/or residential electrical loads.

A fault current is an abnormal current in an electrical system that may result from a fault in the system, such as a short circuit. A fault current may arise in a system due to any number of events or failures, such as power lines or other system components being damaged by severe weather (e.g. lightning strikes). When such a fault occurs, a large load can instantaneously appear in the circuit. In response, the network delivers a large amount of current (i.e. fault current) to the fault load. This surge of current is unwanted because the surge of current can damage the load that may be, for example, the network itself or equipment connected to the network. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure provides a fast switch fault current limiter that facilitates fault current protection using mechanical protection means. As an example, fast switch fault current limiter (FSFCL) according to the present disclosure may include a breaker having electrical breaker contacts, a coil electrically coupled to the electrical breaker contacts, and a plunger mechanically coupled to the electrical breaker contacts, wherein when current greater than a threshold level flows through the coil, a magnetic field having strength to move the plunger is generated, the movement of the plunger operates to open the contacts in the breaker.

The present disclosure provides a current limiter system comprising: a fast switch fault current limiter having electrical breaker contacts, a coil electrically coupled to the electrical breaker contacts, and a plunger mechanically coupled to the electrical breaker contacts, wherein when current greater than a threshold level flows through the coil, a magnetic field having strength to move the plunger is generated, the movement of the plunger operates to open the electrical breaker contacts; a voltage control reactor connected in parallel to the fast switch fault current limiter; and a transient overvoltage control circuit connected in parallel to the fast switch fault current limiter and the voltage control reactor, wherein when current greater than the threshold level flows through the coil, the current transfers to the voltage control reactor and the transient overvoltage control circuit to limit an overall system fault current.

The present disclosure provides a fast switch fault current limiting system, comprising: a fast switch, the fast switch having a breaker having electrical contacts and a coil electrically coupled to the electrical breaker contacts, wherein the fast switch produces a magnetic field; a plunger mechanically coupled to the fast switch; and wherein when current greater than a threshold level flows through the fast switch, a magnetic field produced by the fast switch having strength to move the plunger is generated, the movement of the plunger operates to open the contacts in the breaker and break the current flowing through the fast switch.

BRIEF DESCRIPTION OF THE DRAWINGS

FIGS. 8A-8B depict a fast switch in accordance with an embodiment;

DETAILED DESCRIPTION

Figure 1:
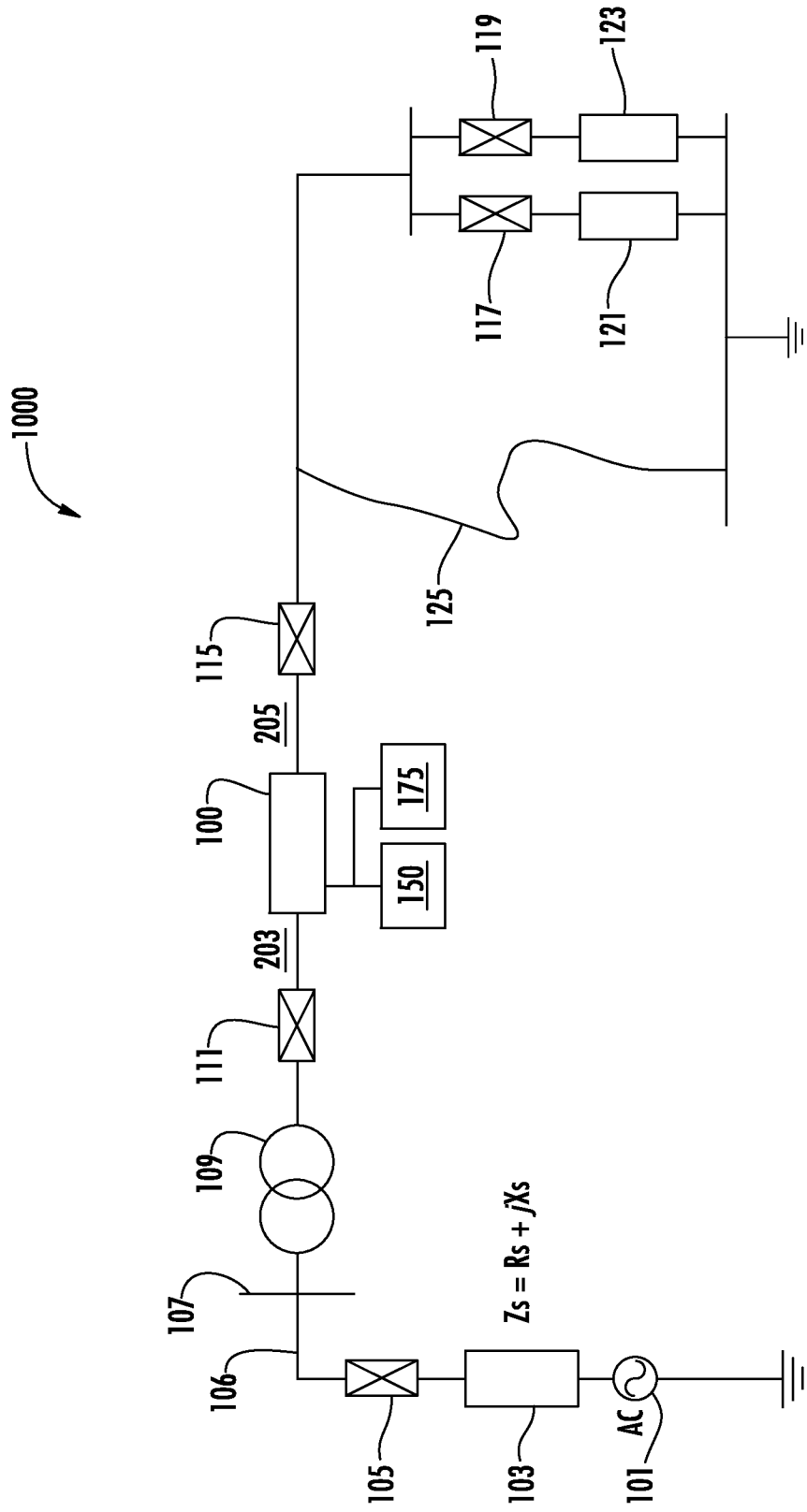
FIG. 1 depicts a fast switch fault current limiting (FSFCL) system in accordance with an embodiment.

Various embodiments will now be described more fully hereinafter with reference to the accompanying drawings. The embodiments described herein may be embodied in many different forms and should not be construed as limited to the embodiments set forth herein. Rather, the embodiments are provided so that this disclosure will be thorough and complete, and will fully convey the scope of the embodiments to those skilled in the art. In the following description, for purposes of explanation, numerous specific details are set forth in order to provide a thorough understanding thereof. It may be evident, however, that the novel embodiments can be practiced not having the specific details. In other instances, well known structures and devices are shown in block diagram form in order to facilitate a description thereof. The intention is to cover all modifications, equivalents, and alternatives consistent with the claimed subject matter. In the drawings, like numbers refer to like elements throughout.

FIG. 1 shows a fast switch fault current limiter (FSFCL) circuit 100, implemented in a power transmission and distribution system 1000. In general, the FSFCL circuit 100 may be configured to protect a variety of circuits and/or loads from short circuit fault currents in various power systems such as, for example, transmission, distribution and generation networks.

A power source 101 supplies power through interface circuit 103 having a complex impedance $Z_s$ comprising a real component $R_s$ and imaginary component $X_s$, and circuit breaker 105. Power transmission line 106 leads to an interface 107 with a substation having a transformer 109 configured to step the transmission line voltage to a voltage compatible with electrical loads 121/123. Output of transformer 109 may be coupled to breaker 111 (such as a circuit breaker that may also be conductor 203 and/or 205) and a FSFCL circuit 100. FSFCL circuit 100 may be coupled through breaker 115, such as a circuit breaker, and matching circuits 117, 119 to electrical loads 121/123. Additional loads and matching circuits may be provided. A short circuit fault 125 may exist and, if present, will be isolated by operation of various embodiments described herein.

The FSFCL circuit 100 can be electrically connected in series to a power source 101 and one or more electrical loads 121, 123 via conductors 203 and 205. In one embodiment, a current sensor 150 may be coupled to and/or in association with a controller 175, having a memory and at least one processor device. Either the controller 175 or current sensor may be coupled to the FSFCL circuit 100. It will be appreciated by those of ordinary skill in the art that the FSFCL circuit 100 can be implemented in a variety of other applications and power system configurations. The particular power system depicted in FIG. 1 is therefore shown by way of example and is not intended to be limiting.

The FSFCL circuit 100 may be implanted in applications where fault protection for the $1^{st}$ peak of the fault is not critically needed. For example, the FSFCL circuit 100 may be configured to limit the fault current quickly (e.g., within a half a cycle) of the occurrence of the fault condition. In some examples, the FSFCL circuit 100 may be configured to sense and limit fault currents within less than a cycle (e.g., <17 ms for 60 Hz system, <20 ms for 50 HZ system, or the like.) As will be appreciated, a circuit breaker may take more than 3 cycles to sense and limit a fault. As such, systems that can tolerate the $1^{st}$ peak fault current may be particularly suited to protection using the FSFCL circuit 100.

Figure 2:
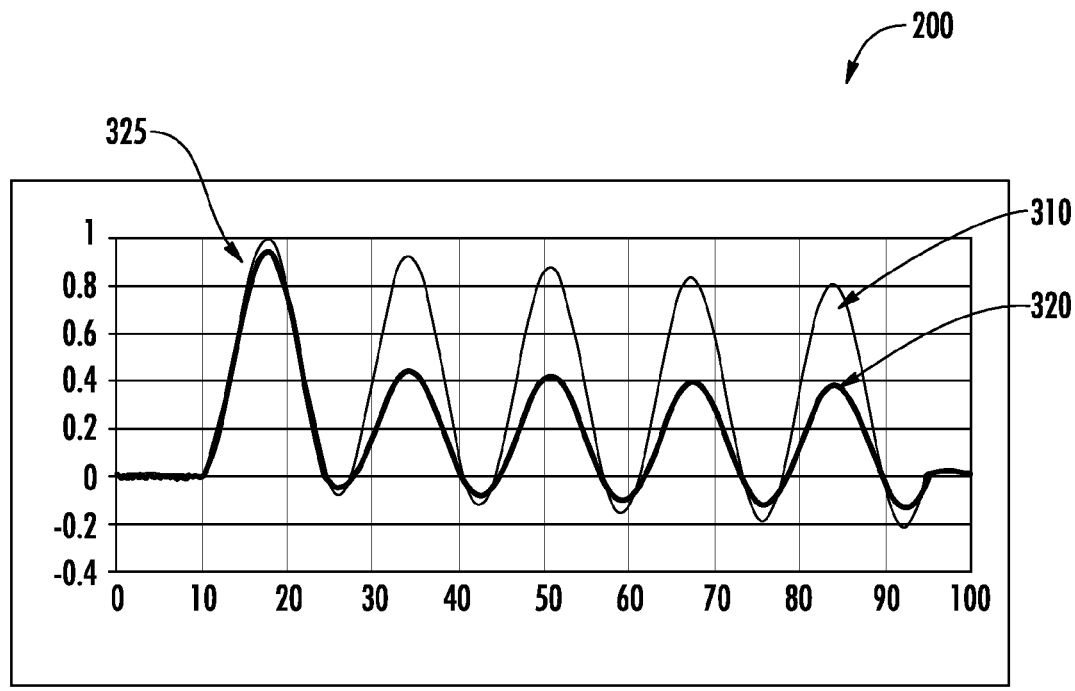
FIG. 2 depicts a current limiting performance chart for the FSFCL circuit in accordance with an embodiment depicts an example current limiting performance chart for the FSFCL system.

FIG. 2 shows an exemplary current limiting performance chart 200 for the FSFCL circuit 100. In particular, FIG. 2 depicts a prospective fault current 310 compared to the limited fault current curve 320 (e.g., current as limited by the FSFCL circuit 100). The current limiting performance chart 200 illustrating current per unit (pu) ranging from −0.4 up to 1 pu compared with time measured in milliseconds (ms) ranging from 0 to 100 ms. The $1^{st}$ peak 325 of the prospective fault current located between approximately 16-19 ms was not limited, however, the remainder of the prospective fault current is reduced by a factor of approximately 50%.

Figure 3:
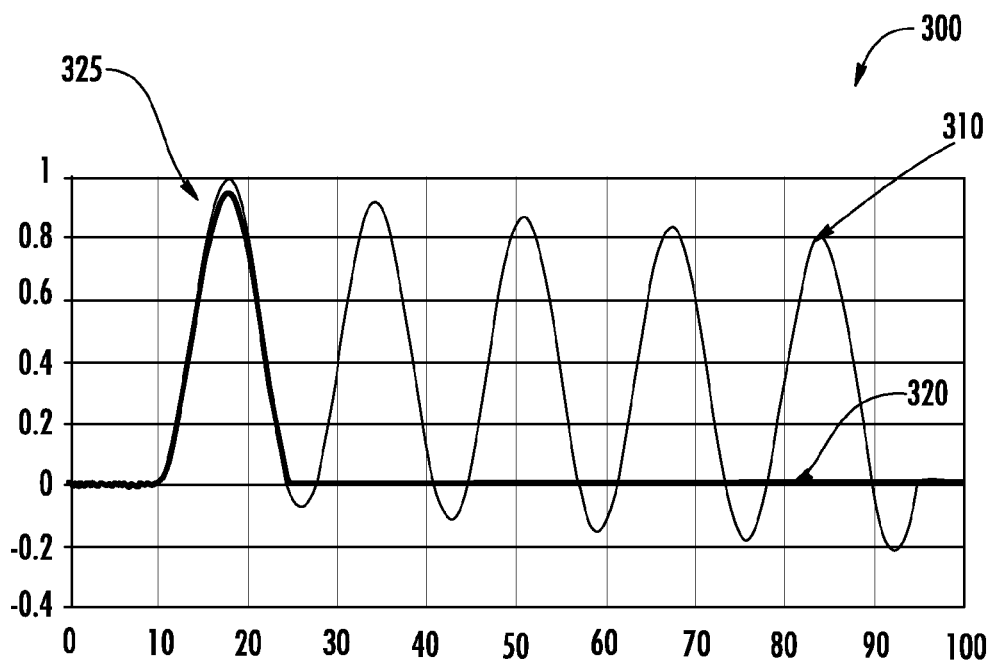
FIG. 3 depicts a current limiting performance chart for the FSFCL circuit with a Fast Switch used as a fast interrupter in accordance with an embodiment depicts an example current limiting performance chart for the FSFCL system.

FIG. 3 shows an exemplary current limiting performance chart 300 for the FSFCL circuit 100 with a Fast Switch used as a fast interrupter. In particular, FIG. 3 depicts the prospective fault current curve 310 compared to the limited fault current curve 320 (e.g., current as limited by the FSFCL circuit 100). The current limiting performance chart 300 illustrating current per unit (pu) ranging from −0.4 up to 1 pu compared with time measured in milliseconds (ms) ranging from 0 to 100 ms. The $1^{st}$ peak 325 of the prospective fault current located between approximately 16-19 ms was not limited, however, the remainder of the prospective fault current is interrupted and reduced to zero. The limited fault current curve 320 is interrupted by the FSFCL circuit 100 when used with a Fast Switch used as a fast interrupter.

FIGS. 4-7 depict various exemplary FSFCL circuits 100 arranged according to at least some embodiments of the present disclosure. Each of the FSFCL circuits 100 depicted in FIGS. 4-7 includes a fast switch 110 (described in greater detail with reference to FIGS. 8A-8B and 9). In general, the fast switch 110 is an electromagnetic switch mechanism including a counter wound windings 204 and 206 coil to produce a magnetic field that moves a plunger to open the switch and limit the current. Once the fast switch 110 opens, the current is then transferred to a parallel connected shunt device (e.g., voltage control reactor, or the like) and the fault current is not received by the electrical loads 121/123 (see FIG. 1).

Figure 4:
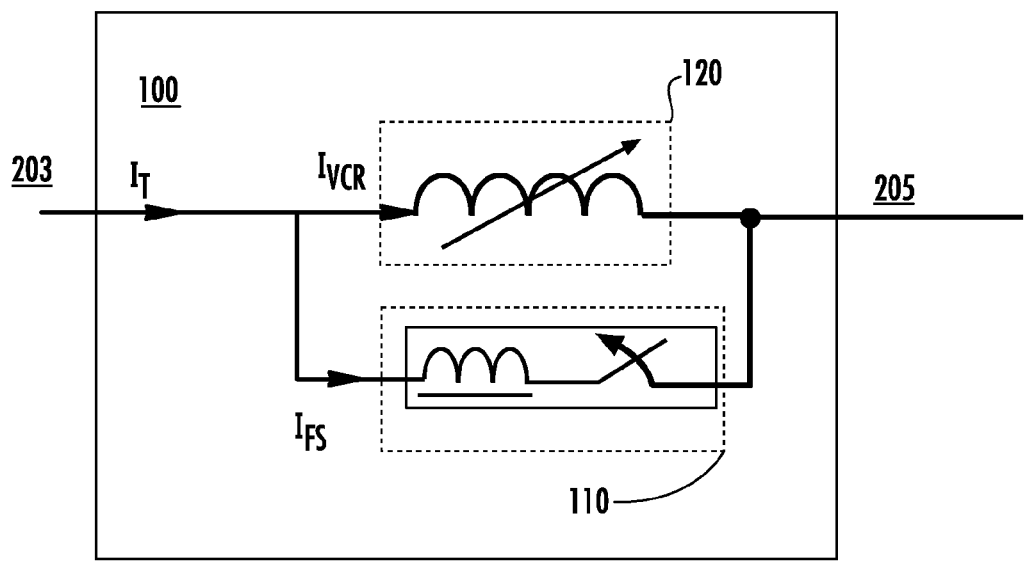
FIG. 4 depicts a FSFCL circuit having the fast switch and a voltage control reactor (VCR) in accordance with an embodiment.

FIG. 4 depicts the FSFCL circuit 100 having the fast switch 110 and a voltage control reactor (VCR) 120. The fast switch 110 and the VCR 120 are electrically connected in parallel. During steady state operation of the FSFCL circuit 100 (e.g., no fault currents detected), current ("$I_T$") will flow in to the FSFCL circuit 100 from a conductor 203, and through the fast switch 110. Incoming system current $I_T$ is split between a first component $I_{VCR}$ flowing through VCR 120 and a current $I_{FS}$ through the fast switch 110. More specifically, during steady state operation the switch contact in fast switch 110 will be closed. As such, the fast switch 110 will conduct current from the conductor 203 to a conductor 205, in effect transmitting power from the source to the electrical loads 121/123. When a current fault is detected, the fast switch 110 will open, forcing the current through the parallel connected VCR 120. The VCR 120 acts to shunt and/or limit the current flowing from the source to the electrical loads 121/123. In other words, during fault current conditions the fast switch will open and the current $I_T$ will be forced to flow through the VCR 120.

Figure 5:
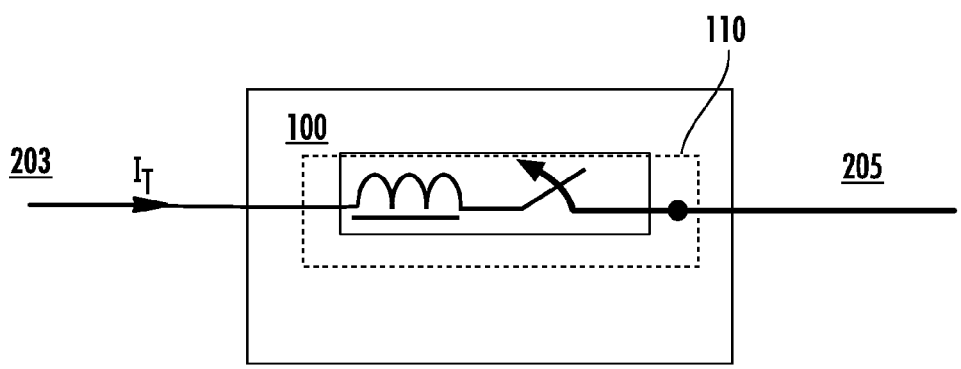
FIG. 5 depicts a FSFCL circuit having a fast switch without a voltage control reactor (VCR) in accordance with an embodiment.

Unlike FIG. 4, FIG. 5 depicts the FSFCL circuit 100 having a fast switch 110 not having the VCR 120. In FIG. 5, the FSFCL circuit 100 includes the fast switch 110 and does not include the use of the VCR 120. Here, the fast switch 110 is used as a fast interrupter. During steady state operation of the FSFCL circuit 100 (e.g., no fault currents detected), current ("$I_T$") will flow in to the FSFCL circuit 100 from a conductor 203, and through the fast switch 110. More specifically, during steady state operation the switch contact in fast switch 110 will be closed. As such, the fast switch 110 will conduct current from the conductor 203 to a conductor 205, in effect transmitting power from the source to the electrical loads 121/123. When a current fault is detected, the fast switch 110 will open, limiting or "fast interrupting" the current flowing from the source to the electrical loads 121/123. In other words, during fault current conditions the fast switch will open and the current $I_T$ will be limited (creates an open circuit)

Figure 6:
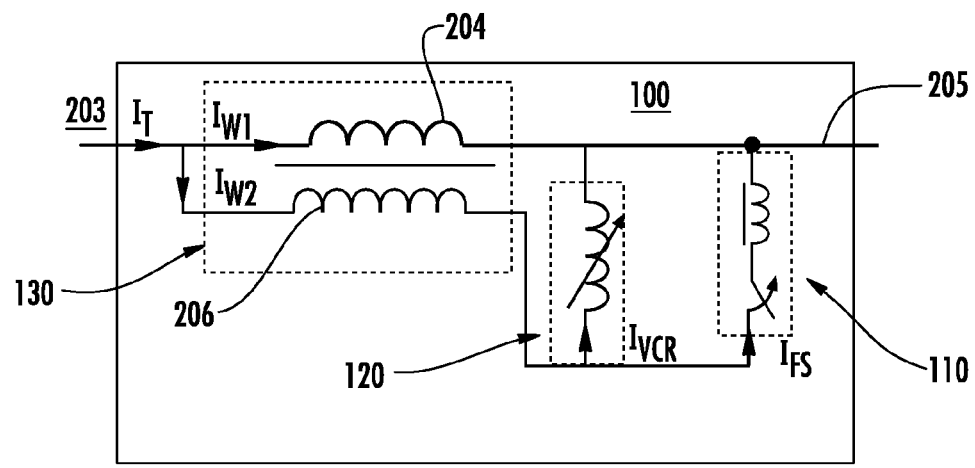
FIG. 6 depicts another FSFCL circuit having the fast switch and a voltage control reactor (VCR) in accordance with an embodiment.

Turning now to FIG. 6, another exemplary embodiment of the FSFCL circuit 100 is depicted. The FSFCL circuit 100 includes the fast switch 110 and a voltage control reactor (VCR) 120. In some examples, such as, for high load current applications, the FSFCL circuit 100 may also include a current splitting reactor (CSR) 130. The CSR 130 may be configured to reduce steady state current handling needs such that a less complex and/or lower cost and/or lower current rating fast switch 110 can used. In some examples, the FSFCL circuit 100 depicted in FIG. 6 may be used for circuits carrying 1 kAmps or greater (e.g., power transmission and/or power distribution). The FSFCL circuit 100 may also include a current splitting reactor (CSR) 130. The CSR 130 may be configured to reduce steady state current handling needs such that a less complex and/or lower cost and/or lower current rating fast switch 110 can used.

The CSR 130 includes a first conductive winding 204 and a second conductive winding 206. Second conductive winding 206 may be counter-wound with respect to first conductive winding 204. The CSR 130 includes the first conductive winding 204 and the second conductive windings 206 that may be configured to exhibit minimal impedance during a steady state operation and a comparatively larger impedance during a fault condition to effectively limit the fault current. CSR 130 may be used to manage high system currents so that a smaller proportion of the normal/steady state and fault currents flow through the FSFCL circuit 100. Incoming system current $I_T$ is split between a first component $I_{W1}$ that flows through the first conductive winding 204, and a second component $I_{W2}$ that flows through the second conductive winding 206. Current $I_{W2}$ is further split between a current $I_{VCR}$ flowing through VCR 120 and a current $I_{FS}$ through the fast switch 110.

In one embodiment, the first conductive winding 204 may be electrically connected in a reverse-parallel relationship with a second conductive winding 206. Current entering the CSR 130 is directed through the first conductive winding 204 in a first direction and through the second conductive winding 206 in a second, opposite direction. In one embodiment, the current flowing through the first conductive winding 204 may therefore be equal to the current flowing through the second conductive winding 206 and, because the first conductive winding 204 and the second conductive winding 206 are arranged in the above-described reverse-parallel configuration, the conductive windings will be magnetically-coupled and will exhibit a negligible net and/or equivalent impedance. The first conductive winding 204 and the second conductive winding 206 may be wound about a magnetic core (e.g. magnetic core 1303 shown in FIG. 13), such as, for example, in a bifilar coil arrangement. Other winding arrangements are available for use and may be applied depending on preference and/or technological requirements. It is contemplated that the core may be an iron core or an air core having dimensions that are dictated by the current limiting requirements of a particular application as will be appreciated by those of ordinary skill in the art.

By using the first conductive winding 204 and the second conductive winding 206 having an appropriate numbers of turns, the steady state operation of the FSFCL circuit 100 may be tailored to distribute steady state current along parallel paths $I_{W1}$ and $I_{W2}$ such that if x % of the steady state current flows along path $I_{W1}$ the remainder (100−x) % of the steady state current flows along path $I_{W2}$. Alternatively, if x % of the steady state current flows along path $I_{W2}$ then the remainder (100−x) % of the steady state current flows along path $I_{W1}$. Thus, during a steady state operation (e.g., steady state condition), the first conductive winding 204 and the second conductive winding 206 of the CSR 103 may be set to distribute the steady state current along parallel paths $I_{W1}$ and $I_{W2}$ in a predefined manner.

In one embodiment, for example, first conductive winding 204 and the second conductive windings 206 may be selected with appropriate numbers of turns for evenly distributing the current in the FSFCL circuit 100 between the paths $I_{W1}$ and $I_{W2}$ such that the current may be distributed so that 50% flows along path $I_{W2}$ and 50% flows along path $I_{W1}$. In other embodiments, the ratio may be set to 40% that flows along path $I_{W2}$ and 60% that flows along path $I_{W1}$; 30% that flows along path $I_{W2}$ and 70% that flows along path $I_{W1}$. In other words, the ratio may be set to 40/60, 30/70, 20/80, for example, along respective paths $I_{W1}$ and $I_{W2}$. In some cases where current distribution must be set more precisely, an external tuning winding (not shown) can implemented as an optional device. During the steady state operations of the FSFCL circuit 100, the current splitting reactor device 130 with the first conductive winding 204 and the second conductive windings 206, that may be counter wound, cancels the magnetic field inside the core of the current splitting reactor. More specifically, the current splitting device splits the steady state current (e.g., system current $I_T$) into two branches ($I_{W1}$ and $I_{W2}$) that flow through the first conductive winding 204 and the second conductive windings 206 in opposite directions to produce a net zero or negligible magnetic field resulting in a negligible equivalent or net impedance in the circuit. The reactance of the first conductive winding 204 is therefore substantially negated by the oppositely-directed reactance of the second conductive winding 206. Thus, by selecting first conductive winding 204 and the second conductive windings 206 having appropriate numbers of turns, a predetermined portion of steady state current can be routed through the CSR. The steady state current load on the FSFCL circuit 100 is reduced relative to conventional FCL systems. The cost and physical size of the FCL can therefore also be reduced.

During steady state operation of the FSFCL system 100, the current splitting device 130 splits current into two branches that flow through the first conductive winding 204 and the second conductive winding 206 in opposite directions to produce a net zero or negligible magnetic field resulting in negligible equivalent or net impedance in the circuit. The reactance of the first winding 204 is therefore substantially negated by the oppositely directed reactance of the second conductive winding 206. Thus, by selecting first conductive winding 204 and the second conductive windings 206 having appropriate numbers of turns, a predetermined portion of steady state current can be routed through the FSFCL circuit 110. The steady state current load on the FSFCL 100 is reduced relative to the total system load current. The cost and physical size of the FSFCL 100 can therefore also be reduced.

Upon the occurrence of a fault condition, the FSFCL 100 is driven into a fault state wherein the FS 110 opens and the impedance exhibited by the FSFCL 100 increases and the proportion of current through the second winding and the FS 110 in parallel with the VCR 120 is significantly reduced relative to the first winding 204 compared to the proportion of the currents during steady state operation. Thus, the first conductive winding 204 and the second conductive windings 206 will no longer produce equal and opposing magnetic fields and will lose their strong magnetic coupling. The windings will therefore exhibit a higher equivalent or net current limiting impedance relative to steady state operation limiting the fault current in the system.

In some examples, the first conductive winding 204 and the second conductive windings 206 in the CSR 130 may be 3:1. More particularly, the second conductive windings 206 may have 3 times as many turns than the first conductive winding 204. As such, during normal operation approximately 25% of the current will flow through the fast switch 110.

Figure 7:
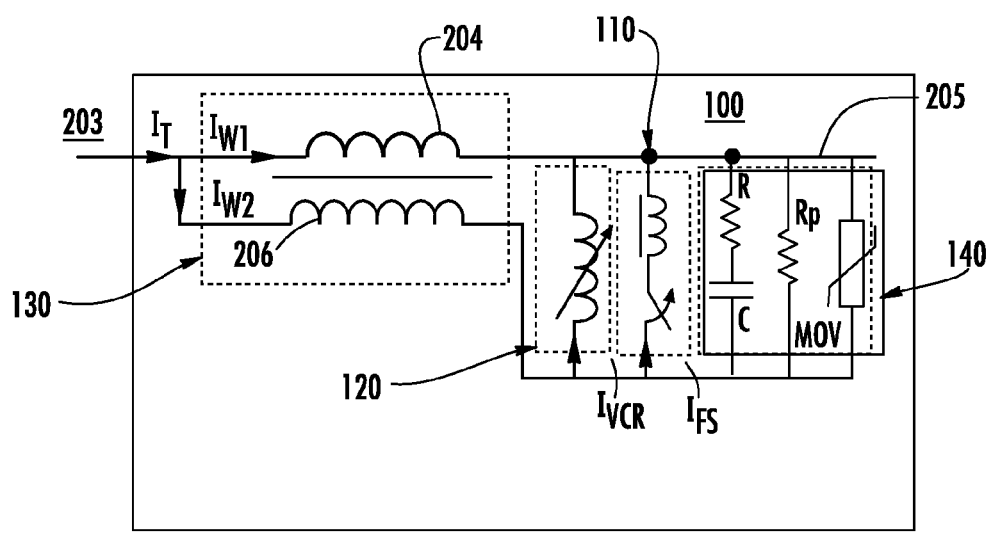
FIG. 7 depicts another FSFCL circuit having the fast switch, a voltage control reactor (VCR), and a transient overvoltage control circuit in accordance with an embodiment.

FIG. 7 illustrates an exemplary embodiment of the FSFCL circuit 100 is depicted. The FSFCL circuit 100 includes the fast switch 110, the control reactor VCR 120, and in some examples, the FSFCL circuit 100 may also include the TOCC 140. In general, the TOCC 140 is a transient overvoltage suppression circuit that includes a parallel connection of a series resistance and capacitance (RC) circuit (resistance labeled as R and capacitors labeled as C), a resistance (labeled as Rp), and a snubber circuit (e.g., metal oxide varistor (labeled as MOV), or the like). In some examples, the TOCC 140 may use high vales of capacitance and resistance values, such as, for instance, a time constant of >100 μs (R*C>100 μs) may be used. A fault current limiter applications operated at power frequencies in circuits with high inductances. As a result, the L·di/dt may generate very high transient overvoltage. The TOCC 140 having high values of capacitances and resistances may facilitate suppression of the transient overvoltages in high inductance circuits.

Figure 8C:
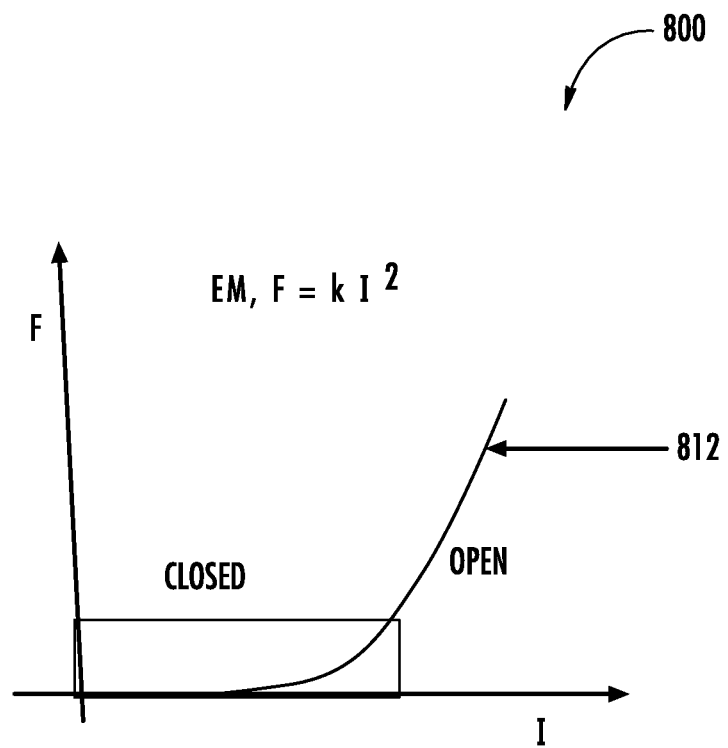
FIG. 8C depicts an example fault current protection chart.

FIGS. 8A and 8B illustrate an exemplary implementation of fast switch 110 in the closed (FIG. 8A) and open (FIG. 8B) positions. Said differently, the fast switch 110 in a steady state operating condition (e.g., no fault detected) is shown in FIG. 8A while the fast switch 110 in fault current condition is shown in FIG. 8B. FIG. 8C illustrates a chart showing the opening force of fast switch 110 (y-axis) vs. current (x-axis). The breaker 111 can be any type of switch, including a dielectric material such as SF6, oil, air, vacuum, or others, such that the fast switch 110 can be opened/closed with the electromagnetic force from coil 112 and is capable of handling the arc produced by the current during open and close cycles.

Turning first to FIG. 8A, during steady state operation, the electrical breaker contacts 111a in a breaker 111, such as a vacuum breaker bottle, are closed. As such, current (i.e., $I_{FS}$) flows from the source through the fast switch 110 to the load. More specifically, the current flows into the fast switch through the breaker 111, through the coil 112, and out the fast switch as indicated by the arrows associated with $I_{FS}$. When a current fault is experienced, the current will increase and the electromagnetic force generated by the increased current flowing through the coil 112 will likewise increase (refer to FIG. 8C). When the electromagnetic force reaches a certain predetermined level depending on the application of the FSFCL circuit 100, the electromagnetic plunger 113 is displaced causing the lever arm 113a to open the electrical breaker contacts 111a. The size of the coil 112 will depend on the particular application based on the force "F" needed to displace the electromagnetic plunger 113 and consequently the lever arm 113a to satisfy the equation $F=kI^2$ where "k" is the mechanical constant associated with the electromagnetic plunger 113 and lever arm 113a. As shown in FIG. 8C, as the current "I" increases, the force F needed to displace the electromagnetic plunger 113 likewise increases as shown by curve 812 whereas the force F needed to keep the electrical breaker contacts 111a closed remains constant. Accordingly, in steady state operation the design of the fast switch 110 is such that the electromagnetic force created by current flowing through the coil 112 is low enough not to force the breaker 111 contacts to open. When the fault current, greater than the steady state operating current, flows through the coil 112, a greater than steady state electromagnetic force is generated to such a degree that the electromagnetic force moves the electromagnetic plunger 113 causing the electrical breaker contacts 111a to open.

Turning now to FIG. 8B, the electrical breaker contacts 111a of breaker 111 are shown as being open. Once open, the current path through the fast switch 110 is broken and the current flow transfers to the parallel shunt circuitry (e.g., VCR 120, TOCC 140, or the like) if provided. In some examples, the fast switch 110 is designed to open at current zero crossing (refer to FIG. 2). The breaker 111 may be a vacuum style breaker having adequate operating characteristics associated with a current zero crossing opening. As such, opening at current zero crossing can be achieved with zero or minimum current chopping. Furthermore, as described above with respect to FIG. 7, some examples may provide for transient overvoltage protection using the TOCC 140. The TOCC 140 may include resistance, capacitance, and MOV.

During steady state operation of the fast switch 110, the coil 112 introduces negligible impedance to the system. As such, the voltage drop across the fast switch will be negligible resulting in minimal power loss. During fault, the VCR 120 (the VCR 120 may be connected in parallel with the fast switch 110), TOCC 140 circuits and the CSR 130 can handle current limiting. The fast switch 110 may be configured with a timing circuit 114. The timing circuit 114 may include an air cylinder 114a and spring mechanism 114b (e.g., electromagnetic force control mechanisms) configured to provide a time delay mechanism for closing the electrical breaker contacts 111a in the breaker 111 after the fault is cleared that can vary from instant closure to some predefined time delay.

Figure 9:
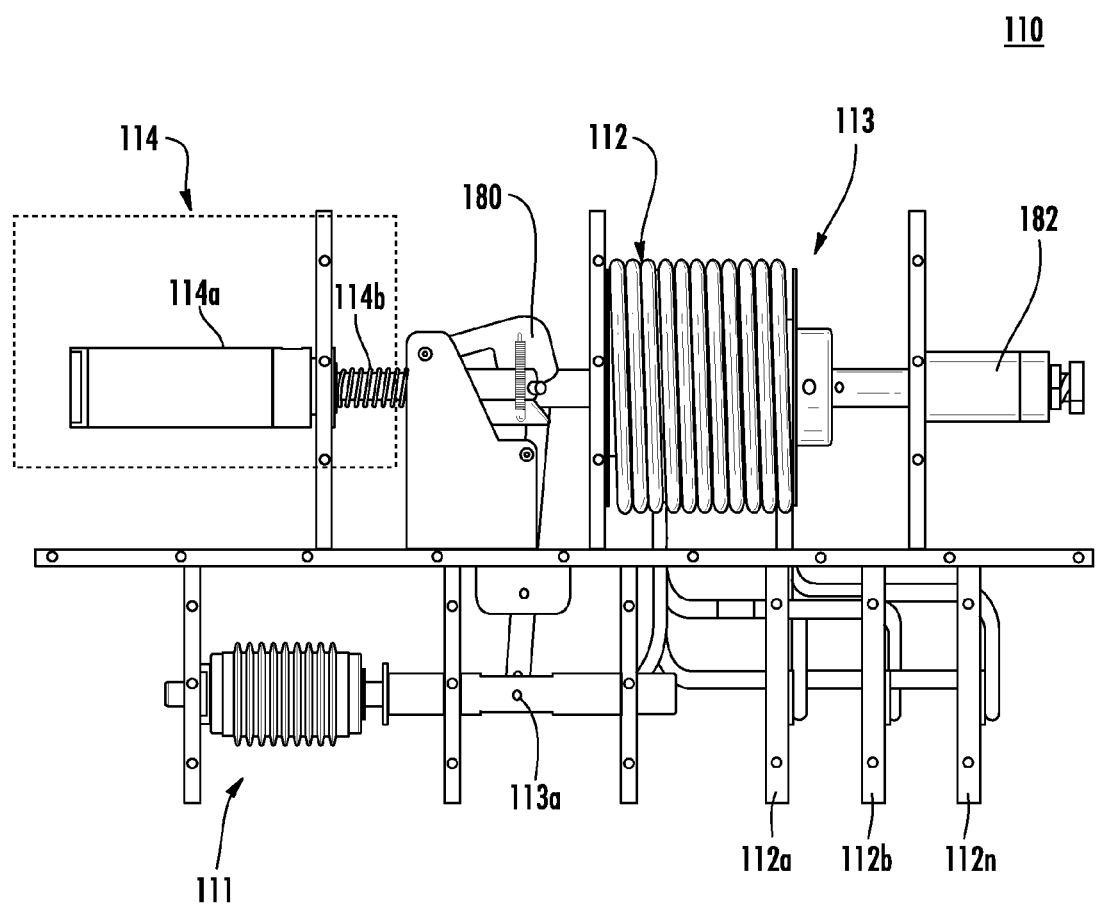
FIG. 9 depicts another fast switch in accordance with an embodiment.

FIG. 9 illustrates an exemplary embodiment of the fast switch 110. As can be seen from this figure, the fast switch 110 includes breaker 111, coil 112, plunger 113, timing circuit 114, as well as other components, such as a pre-travel adjustment device 182, spring mechanism 114b, and lever arm 113a. The fast switch 110 shown may be configured with more than one coil 112 (112a, 112b, and 112c) may be used depending upon the voltage and current of the source, as well as the protection level for the load. The multiple coils can be connected in parallel or series in order to achieve the current limiting characteristics and minimize impedance introduced into the system. The operation of the fast switch 110 shown in FIG. 9 is similar to that described above with respect to FIGS. 8A-8B. For example, during steady state operation the contacts in the breaker 111 will be closed and current will flow through the coil(s) 112 to the load. When fault current levels are experienced in the system, the electromagnetic force generated by current flowing through the coil(s) 112 will increase moving the electromagnetic plunger 113 and will in turn (via lever arm 113a) open the contacts in the breaker. The timing circuit 114 may be configured to cause the breaker to close after a predetermined amount of time has elapsed. Additionally, the fast switch 110 may be configured with lock mechanism 180 that may be used to manually or automatically reset of the fast switch 110 after a fault condition.

Figure 10:
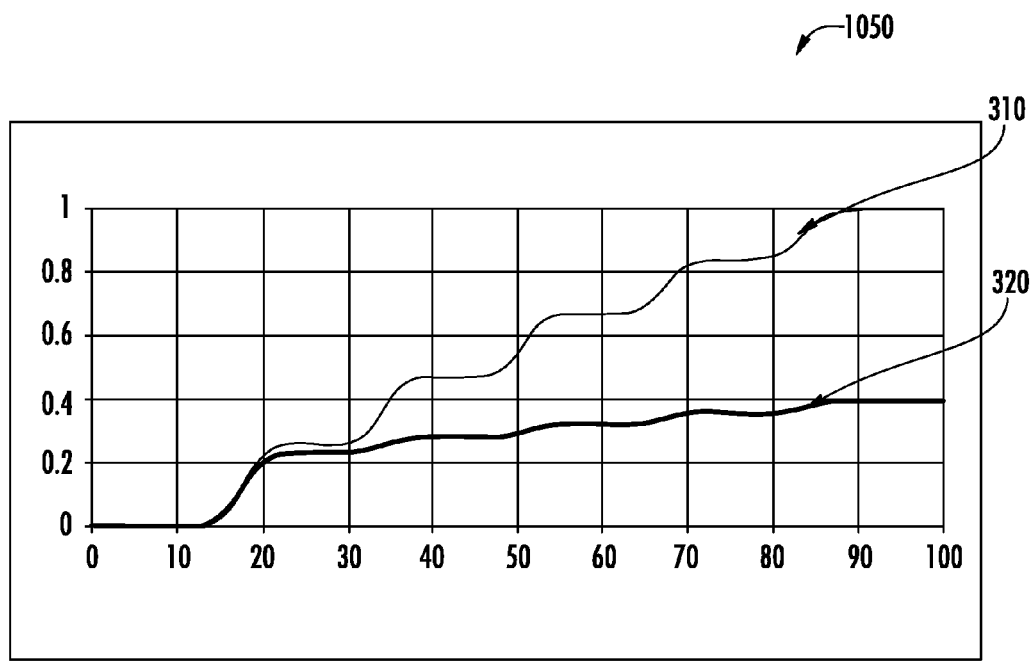
FIG. 10 depicts a chart illustrating energy limiting characteristics vs. prospective energy of a fault.

FIG. 10 illustrates a chart 1050 depicting how the $\int I^2 \cdot dt$ is affected by the application of the fast switch 110. In particular, chart 1050 illustrates current per unit (pu) ranging from −0.4 up to 1 pu compared with time measured in milliseconds (ms) ranging from 0 to 100 ms. In this example, the $\int I^2 \cdot dt$ curve is reduced to 40% of its prospective value that is illustrated by the comparison between the prospective fault current curve 310 and the limited fault current curve 320. This means the electromagnetic force ($F=k_F \int I^2 \cdot dt$) on system components, such as transformers, reactors, busbars, grounding structures, and breaker components, is reduced to 40%. This reduction may be significant if the fault current reduction is >50%. In addition, the thermal energy ($Q=k_T \cdot \int I^2 \cdot dt$) is also reduced by approximately 40% of the prospective fault value. The thermal energy is related to an overall heating and arc energy associated with the system and system components. By reducing the thermal energy, thermal related stress on system components, such as transformers, reactors, busbars, grounding structures, and breaker components, are likewise reduced and extend the useable life of such components.

Figure 11:
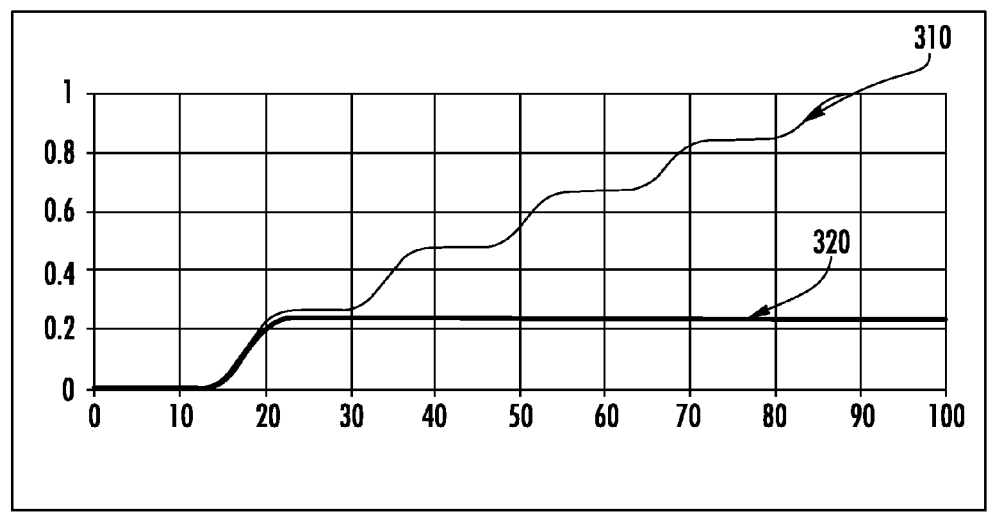
FIG. 11 depicts an additional chart illustrating an energy limiting characteristics vs. prospective energy of a fault.

FIG. 11 illustrates a chart 1100 depicting how the $\int I^2 \cdot dt$ is affected by the application of the fast switch 110 not having the current splitting reactor and not having the VCR 120. The chart 1100 illustrates current per unit (pu) ranging from −0.4 up to 1 pu compared with time measured in milliseconds (ms) ranging from 0 to 100 ms. In this example, the $\int I^2 \cdot dt$ curve is reduced to 20% of its prospective value that is illustrated by the comparison between the prospective fault current curve 310 the limited fault current curve 320. This means the electromagnetic force ($F=k_F \int I^2 \cdot dt$) on system components, such as transformers, reactors, busbars, grounding structures, and breaker components, is reduced to 20%. This reduction can be significant if the fault current reduction is >50%. In addition, the thermal energy ($Q=k_T \cdot \int I^2 \cdot dt$) is also reduced by approximately 20% of the prospective fault value. The thermal energy is related to an overall heating and arc energy associated with the system and system components. By reducing the thermal energy, thermal related stress on system components, such as transformers, reactors, busbars, grounding structures, and breaker components, are likewise reduced and extend the useable life of such components.

Figure 12:
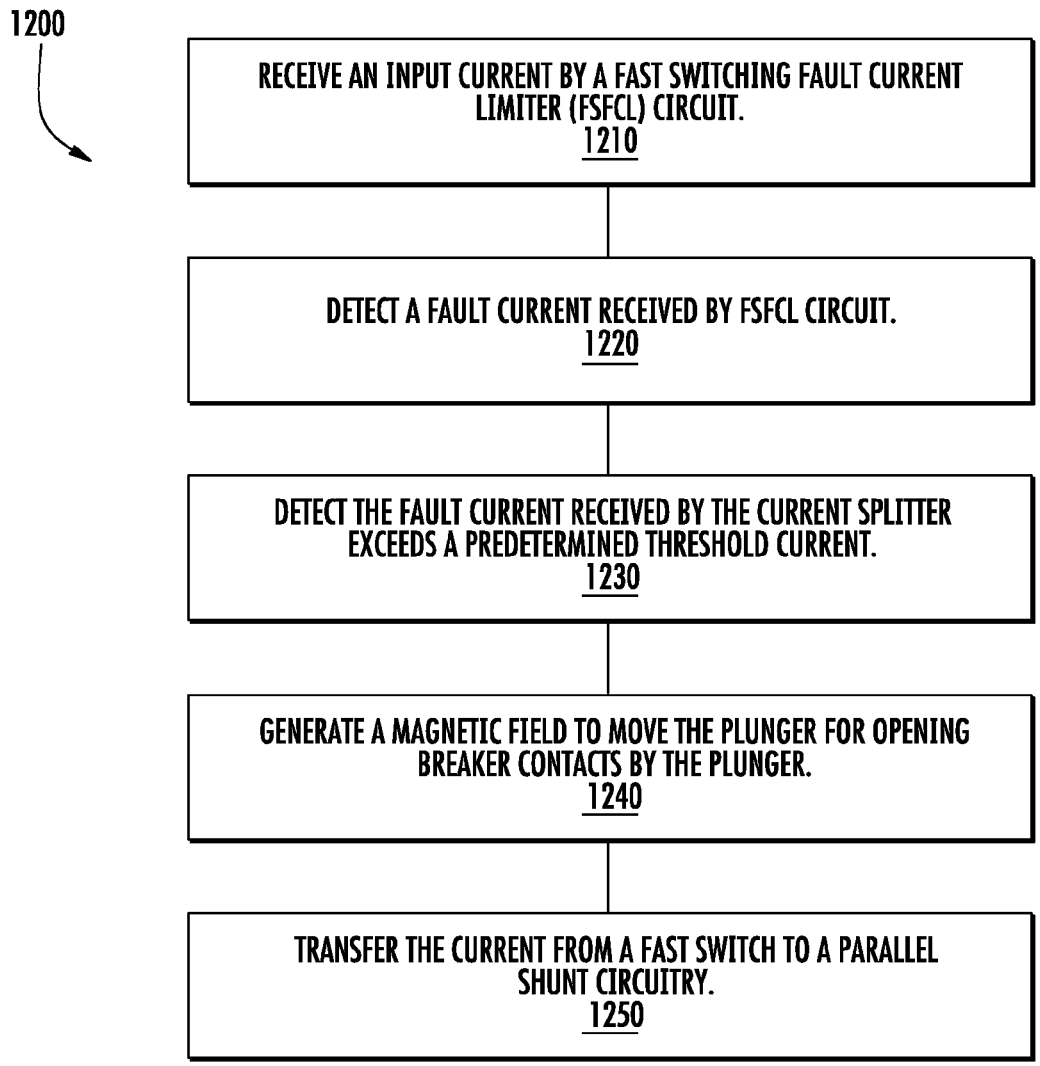
FIG. 12 illustrates a method of operation of a solid-state fault current limiter system in accordance with an embodiment of the present disclosure.

FIG. 12 illustrates flowchart 1200 for a method of operation of fast switch fault current limiter having breaker contacts system. During steady state operation, a current flows from a source through the FSFCL circuit 100 (e.g., the fast switch 110) to the load at 1210. More specifically, the current flows into the fast switch 110 through the breaker 111, coil 112, and out fast switch 110. At 1220, the FSFCL circuit 100 detects a fault current. When a current fault is experienced at 1220, the current will increase, and the electromagnetic force generated by the increased current flowing through the coil 112 will likewise increase when the electromagnetic force reaches a certain predetermined threshold current level depending on the application of the FSFCL circuit 100. At 1230, the increased current flowing through the coil 112 is detected to exceed a predetermined threshold current. The electromagnetic plunger 113 is displaced causing the lever arm 113a of the electromagnetic plunger 113 to open the electrical breaker contacts 111a at 1240. The size of the coil 112 will depend on the particular application based on the force "F" needed to displace the electromagnetic plunger 113 and consequently the lever arm 113a to satisfy the equation $F=kI^2$ where "k" is the mechanical constant associated with the electromagnetic plunger 113 and lever arm 113a. As the current "I" increases, the force F needed to displace the electromagnetic plunger 113 likewise increases as shown by curve whereas the force F needed to keep the electrical breaker contacts 111a closed remains constant. Accordingly, in steady state operation the design of the fast switch 110 is such that the electromagnetic force created by current flowing through the coil 112 is low enough not to force the breaker 111 contacts to open. When the fault current, greater than the steady state operating current, flows through the coil 112, electromagnetic force is produced and generated to such a degree that the electromagnetic force cause the electromagnetic plunger 113 to move. The electrical breaker contacts 111a to open as a result of the electromagnetic plunger 113 moving.

Once open, at 1250, the current path flowing through the fast switch 110 is broken and the current flow transfers to the parallel shunt circuitry (e.g., VCR 120, TOCC 140, or the like) if provided. In some examples, the fast switch 110 is designed to open at current zero crossing (refer to FIG. 2). The breaker 111 may be a vacuum style breaker having adequate operating characteristics associated with a current zero crossing opening. As such, opening at current zero crossing can be achieved with zero or minimum current chopping. Furthermore, as described above with respect to FIG. 7, some examples may provide for transient overvoltage protection using the TOCC 140. The TOCC 140 may include resistance, capacitance, and MOV.

Figure 13:
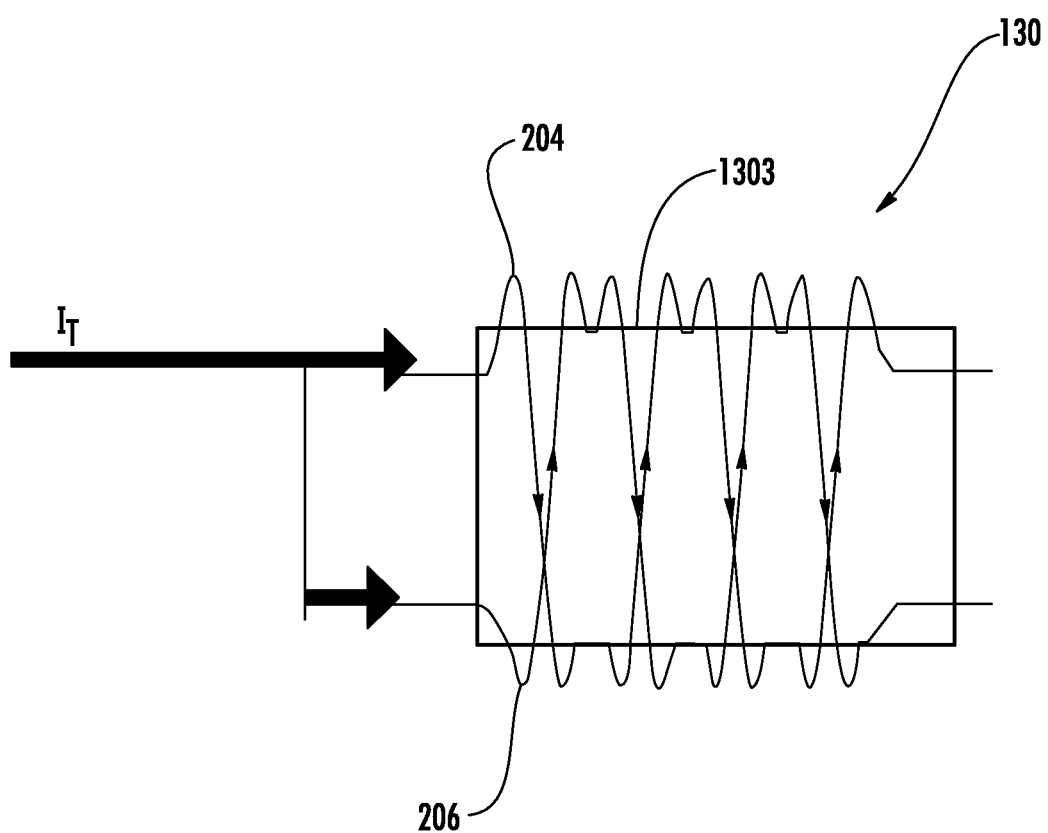
FIG. 13 depicts a FCL circuit with a first and second winding wound around a core in accordance with an embodiment of the present disclosure

Turning briefly to FIG. 13, an exemplary embodiment of the CSR 130 is shown having a first conductive winding 204 and a second conductive winding 206 wound about a magnetic core 1303. First conductive winding 204 and the second conductive winding 206 may be counter-wound or in a bifilar arrangement and have an equal number of turns. Other winding arrangements are available for use and may be applied depending on preference and/or technological settings. It is contemplated that the magnetic core 1303 may be an iron core or an air core having dimensions that are dictated by the current limiting needs of a particular application as will be appreciated by those of ordinary skill in the art. The first conductive winding 204 and the second conductive winding 206 that may be configured to exhibit minimal impedance during a steady state operation and a comparatively larger impedance during a fault condition to effectively limit the fault current.

In one embodiment, the first conductive winding 204 may be electrically connected in a reverse-parallel relationship with a second conductive winding 206. Current entering the CSR 130 is directed through the first conductive winding 204 in a first direction and through the second conductive winding 206 in a second, opposite direction. In one embodiment, the current flowing through the first conductive winding 204 may be equal to the current flowing through the second conductive winding 206 and, because the first conductive winding 204 and the second conductive winding 206 are arranged in the above-described reverse-parallel configuration, the conductive windings will be magnetically-coupled and will exhibit a negligible net and/or equivalent impedance.

In summary, the present embodiments provides a current protection system providing fault protection using mechanical protection device that provides a benefit over other electronic protection circuits that may be more complex and costly. For example, the FSFCL of the present disclosure may provide for a reduction of arc flash energy for circuit breakers and the corresponding safety benefits that come with operating and handling lower arc flash energy. This may be useful as a permanently installed fault protection device or as a portable fault protection device. For example, as a portable device it may be used as a safety device for personnel working in switchgear areas where the use of this device reduces the potential current. Furthermore, the FSFCL may be used for in low and high current applications. Reducing the arc energy can also reduce fire hazards due to electrical short circuit faults. This application benefits electric utilities subjected to fire hazards due to electric fires.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A fast switch fault current limiter, comprising:
   a breaker having electrical breaker contacts;
   a coil electrically coupled to the electrical breaker contacts; and
      a plunger mechanically coupled to the electrical breaker contacts, the plunger configured to open the electrical breaker contacts, wherein when current greater than a threshold level flows through the coil, a magnetic field having strength to move the plunger is generated, the movement of the plunger operates to open the contacts in the breaker; and
   a voltage control reactor (VCR) connected in parallel to the coil, wherein VCR is configured to receive the current in response to a break in the current flowing through the coil.

2. The fast switch fault current limiter of claim 1, wherein the electrical breaker contacts are configured to break the current flowing through the coil by the movement of the plunger.

3. The fast switch fault current limiter of claim 1, further comprising a current splitting reactor (CSR) electrically connected to the coil, the CSR used for current limiting, and the CSR and the VCR used to limit or control a voltage.

4. The fast switch fault current limiter of claim 1, the plunger further comprising a lever arm, the lever arm operates to open the electrical breaker contacts.

5. The fast switch fault current limiter of claim 1, further comprising a timing circuit, having electromagnetic force control mechanisms, electrically coupled to the electrical breaker contacts for closing the electrical breaker contacts.

6. The fast switch fault current limiter of claim 5, wherein the electromagnetic force control mechanisms includes an air cylinder and a spring mechanism, wherein the timing circuit instantaneously closes the contacts in the breaker after a fault current is cleared, or closes the electrical breaker contacts after the fault current is detected following a predefined time delay.

7. The fast switch fault current limiter of claim 1, further includes a transient overvoltage control circuit connected to the coil, the transient overvoltage control circuit to limit overvoltages.

8. A current limiter system comprising:
   a fast switch fault current limiter having electrical breaker contacts, a coil electrically coupled to the electrical breaker contacts, and a plunger mechanically coupled to the electrical breaker contacts, wherein when current greater than a threshold level flows through the coil, a magnetic field having strength to move the plunger is generated, the movement of the plunger operates to open the electrical breaker contacts;
   a voltage control reactor connected in parallel to the fast switch fault current limiter; and
   a transient overvoltage control circuit connected in parallel to the fast switch fault current limiter and the voltage control reactor, wherein when the current flowing through the coil is greater than the threshold level, the current transfers to the voltage control reactor and the transient overvoltage control circuit to limit a fault current.

9. The current limiter system of claim 8, the movement of the plunger operates to break the current flowing through the coil.

10. The current limiter system of claim 8, wherein the electrical breaker contacts are configured to break the current flowing through the coil by the movement of the plunger.

11. The current limiter system of claim 8, further comprising a current splitting reactor electrically connected to the fast switch fault current limiter, the current splitting reactor used to limit or control the current.

12. The current limiter system of claim 8, the plunger further comprising a lever arm, the lever arm operates to open the electrical breaker contacts.

13. The current limiter system of claim 8, further comprising a timing circuit, having electromagnetic force control mechanisms, electrically coupled to the electrical breaker contacts for closing the electrical breaker contacts.

14. The current limiter system of claim 13, wherein the electromagnetic force control mechanisms includes an air cylinder and a spring mechanism, wherein the timing circuit either instantaneously closes the contacts in the breaker after a fault current is cleared, or closes the electrical breaker contacts after the fault current is detected following a predefined time delay.

15. A fast switch fault current limiting system, comprising:
   a fast switch, the fast switch having a breaker having electrical breaker contacts and a coil electrically coupled to the electrical breaker contacts, wherein the fast switch produces a magnetic field; and
      a plunger mechanically coupled to the fast switch, the plunger configured to open the electrical breaker contacts, wherein when current greater than a threshold level flows through the fast switch, a magnetic field produced by the fast switch having strength to move the plunger is generated, the movement of the plunger operates to open the contacts in the breaker and break the current flowing through the fast switch; and
   a voltage control reactor (VCR) connected in parallel to the fast switch, wherein the current is forced through the VCR in response to a break in the current flowing through the fast switch.

16. The fast switch fault current limiting system of claim 15, further comprising:
   a current splitting reactor (CSR) electrically connected to the coil, the CSR used for current limiting, and the CSR and the VCR used to limit or control a voltage, and
   a timing circuit electrically coupled to the fast switch for closing the electrical breaker contacts.

17. The fast switch fault current limiting system of claim 15, further comprising a transient overvoltage control circuit, having a parallel connection of a series resistance and capacitance (RC) circuit and a resistance connected in parallel to the fast switch and the voltage control reactor for limiting a fault current.

18. The fast switch fault current limiting system of claim 15, wherein the fast switch is configured as a fast interrupter of the fault current.

* * * * *